United States Patent [19]

Severance

[11] 4,079,670

[45] Mar. 21, 1978

[54] PHASE LOCK FONT POSITION AND IMPACT HAMMER TIMING CONTROL

[75] Inventor: Phil Ross Severance, Westlake Village, Calif.

[73] Assignee: Dataproducts, Woodland Hills, Calif.

[21] Appl. No.: 805,350

[22] Filed: Jun. 10, 1977

[51] Int. Cl.² .............................................. B41J 9/18
[52] U.S. Cl. ............................ 101/93.09; 101/93.14; 364/900
[58] Field of Search ............... 101/93.09, 93.04, 93.14, 101/93.29–93.36, 93.48, 111; 340/172.5

[56] References Cited

U.S. PATENT DOCUMENTS

| | | | |
|---|---|---|---|
| 2,993,437 | 7/1961 | Dener et a. | 101/93.14 |
| 3,286,625 | 11/1966 | Petit | 101/93.09 |
| 3,408,633 | 10/1968 | Shimabukuro | 340/172.5 |
| 3,582,897 | 1/1971 | Marsh | 340/172.5 |
| 3,795,186 | 3/1974 | Curtiss et al. | 101/93.14 |
| 3,827,357 | 8/1974 | Mahoney | 101/93.14 |
| 3,921,517 | 11/1975 | Barconb et al. | 101/93.09 |
| 3,952,648 | 4/1976 | Sery et al. | 101/93.14 |

Primary Examiner—Edward M. Coren
Attorney, Agent, or Firm—Stuart Lubitz

[57] ABSTRACT

A timing and control circuit for a wide spanning impact hammer used in a digital printer can be fabricated by using a phase lock loop oscillator driven by a character pulse clock to output a plurality of timing pulses during the character pulse width. Appropriate intervals are selected from the timing pulses to generate a plurality of shifted timing pulses to be used as inputs to logic circuitry. Combination of the shifted timing pulses and logic circuitry together with control commands from a printer controller, can be used to generate a hammer trigger and hammer reset pulse. The hammer trigger and reset pulses are used in a conventional hammer matrix to fire the multiple spanning hammers at the appropriate times.

12 Claims, 3 Drawing Figures

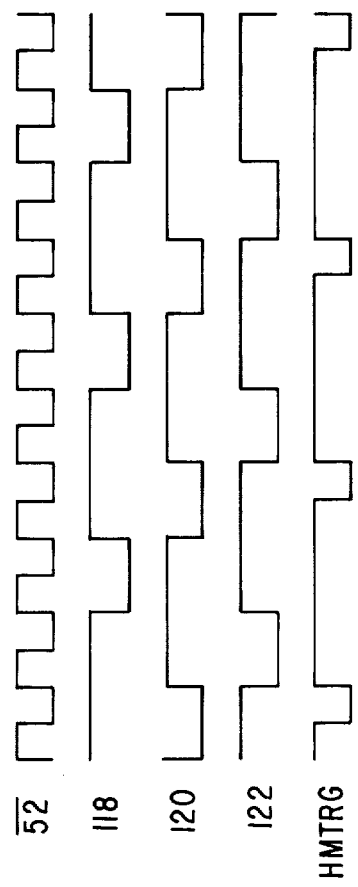

PHASE LOCK FONT POSITION AND IMPACT HAMMER TIMING CONTROL

BACKGROUND OF THE INVENTION

1. Field of the Invention

The present invention relates to control circuitry used for timing the firing of wide spanning hammers and in particular, to wide spanning hammers capable of operating in more than one printing mode, e.g., as double or triple spanning hammers.

2. Description of the Prior Art

In the prior art, multiple spanning hammers, such as double or triple spanning hammers, are fired by complex circuitry using logically controlled one shot pulse generators or complex schemes for adding phase delays. Such prior art circuitry is not only complex and expensive to construct and to maintain, but is ill-adapted to operation in multiple modes of operation. In addition, such prior art control circuitry is unable to track significant font speed variations and requires complex adjustments in order to remain calibrated to a given font speed. Furthermore, prior art control circuitry for impact hammers operable both as double and triple spanning hammers is cumbersome and requires complex circuit design requiring a substantial degree of circuit replication.

The present invention overcomes each of these disadvantages found in the prior art and allows a font position and timing circuit to be easily and inexpensively fabricated which will track font speeds and be capable of operating in a plurality of print modes, such as both double and triple spanning hammer operations.

SUMMARY OF THE INVENTION

The present invention is a circuit for timing control in an impact printer employing multiple-character spanning hammers in combination with a moving character font and a means for generating character pulses signifying movement of each character within the font by a distance equal to the distance between each character within the character font. The circuit comprises an oscillator means having an input coupled to the character pulses. The oscillator means is used for generating a preselected number of clock pulses during each of the character pulses. A shift means is employed to generate a plurality of shifted pulses corresponding to the number of clock pulses. The shift means has an input coupled to the oscillator means. A logic means is employed for logically combining selected ones of the plurality of shifted pulses, for selectively generating a plurality of hammer trigger pulses and for selectively generating a hammer reset pulse. By virtue of the combination of the above elements timing for multiple-character spanning hammers may be effected such that the timing automatically tracks variations and character font velocity and provides appropriate timing for multiple modes of printing by multiple-character spanning hammers.

In particular, the oscillator means of the present invention may be a phase locked loop oscillator. The shift means may include at least one shift register to divide the clock pulses down to a signal having the same frequency as the character pulses.

In particular, the present invention is embodied in the circuit for a timing control in an impact printer employing wide spanning hammers in combination with a moving font band and a means for generating a plurality of character pulses signifying movement of each character of the font band by a distance equal to the distance separating each character of the font band. The distance separating each character of the font band is greater than the width of the wide spanning hammer. The circuit comprises a phase locked loop oscillator, a first shift register and a plurality of logical gates. The invention may further include a second shift register. The phase locked loop oscillator generates a predetermined number of shift register pulses during each character pulse. A first subset of the number of shift register pulses is an integrally divisible number thereby permitting the wide spanning hammers to be fired at one of the preselected plurality of print positions. A second subset of the predetermined number of shift register pulses makes up the remaining ones of the predetermined number of shift register pulses. A first shift register circuit employs the shift register pulses as a controlling or clock input. The shift registered circuit generates a uniform plurality of the first shifted pulses. Each first shifted pulse has an active nonoverlapping state within the character pulse. One of the first shifted pulses is always in the active state at any instance during the character pulse. Further, the first shift register circuit generates a uniform plurality of second shifted pulses. Each second shifted pulse has an active nonoverlapping state during the interval within each of the first shifted pulses. One of the second shifted pulses is always in an active state at any given instant during one of the first shifted pulses. Finally, a plurality of logic gates is employed for logically combining selected ones of the first and second shifted pulses, the shift register pulses and external comand signals in order to selectively generate one of the plurality of timed hammer reset pulses.

The circuits may further include a second shift register circuit being responsive to the shift register pulses generated by the phase locked loop oscillator to generate a plurality of third shifted pulses logically combined in a logic circuit to generate a pulse train of hammer trigger pulses having an active state temporarily separated by a duration equal to the second subset of the pre-determined number of shift pulses.

In the illustrated embodiment discussed below, twenty-seven shift register pulses are generated during each character pulse. Twenty-four of the pulses are included in the first subset and three are included in the second subset. The second shifted pulses are generated by divided-by-three shift register having the shift register pulse as a clock input. The first shifted pulses are generated by a divide-by-nine shift register which has one of the second shifted pulses as a clock input. Finally, a divide-by-two shift register with one of the first shift pulses as the clock input divides the signal down to a frequency equal to a character pulse input into the phase locked loop oscillator.

The second shift register in the illustrated embodiment generates two shifted pulses and has an inverted shift register pulse as its clock input. The two shifted pulses and the shift register pulses are logically combined in a nand gate to generate nine hammer trigger pulses during each character pulse. Each hammer trigger pulse is temporally separated in duration by a time period equal to three shift register pulses. Advantages and other embodiment of the present invention are best understood by viewing the following figures in connection with the detailed description of the preferred embodiments.

BRIEF DESCRIPTION OF THE DRAWINGS

FIG. 3 is a timing diagram showing the relationship between the character pulse and the various pulses generated within the circuitry of FIG. 1.

DETAILED DESCRIPTION OF THE PREFERRED EMBODIMENTS

The present invention is a phase lock font position and a hammer timing control circuit which is used to divide the pulse width of the character period into twenty-seven equal increments for controlling the firing of wide spanning hammers for any required column position. The timing relationships required to fire the wide spanning hammers and control column position are derived from a phase lock oscillator operating as a frequency multiplier. Each character pulse from the font band is processed by the phase lock multiplier into 27 discrete intervals which can represent either time or position relationships. Appropriate intervals are then selected to control the firing of hammers for any required column position. As a result, the present circuitry can be used to create pulses for generation of hammer fire both in the mode where odd and even print positions are printed and in compressed font print modes where three positions, A, B and C are printed. Moreover, the circuitry of the present invention inherently tracks band speed over a substantial range. These and other embodiments and advantages of the present invention are best understood by considering the following detailed descriptions in connection with FIG. 1.

Figure 1:
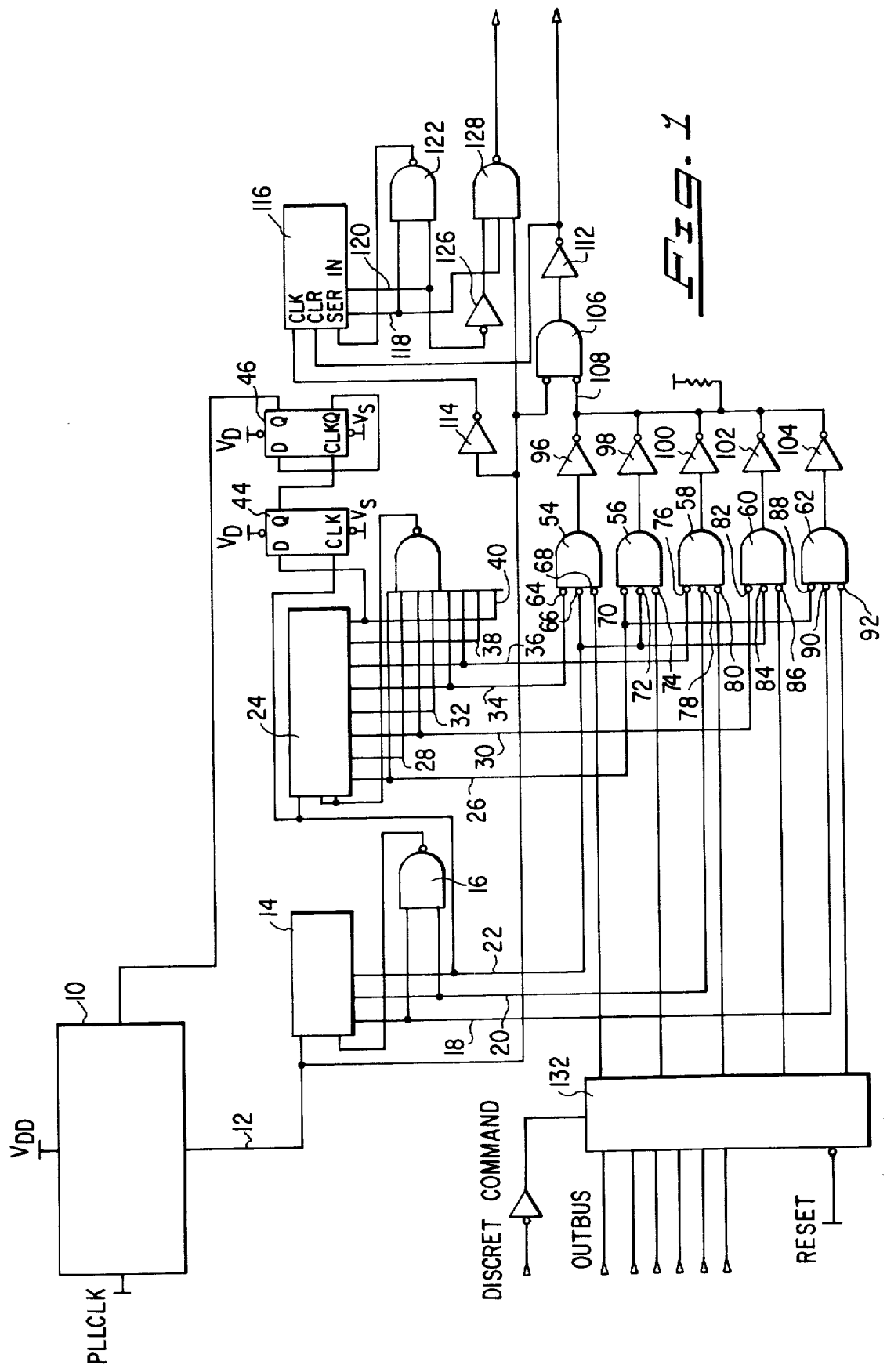
FIG. 1 is a simplified schematic view of the present invention showing the phase lock oscillator, shift registers and logic circuitry used to generate the hammer trigger and hammer reset signals.

FIG. 1 is a simplified block diagram of the phase and timing circuitry of the present invention. A character pulse clock, PLLCLCK, is generated from a conventional reluctance detector sensing timing marks from a font printing band. The character pulse serves as an input to a phase lock loop oscillator 10. The phase lock loop oscillator may be of conventional design and appropriately compensated for temperature and voltage drifts. The output 12 of oscillator 10 is coupled into a five bit shift register 14 and employed as the shift register's clock. By appropriately coupling selected outputs 18, 20 and 22 of shift register 14 through nand gate 16 in a conventional manner, shift register 14 can be used as a divide-by-three circuit.

Output 22 of shift register 14 is used as an input clock to eight bit shift register 24. Similarly, outputs 26-40 of shift register 24 serve as inputs to nand gate 42 which has its output appropriately coupled to shift register 24 such that shift register 24 functions in a conventional manner as a divide-by-eight circuit.

Figure 2:
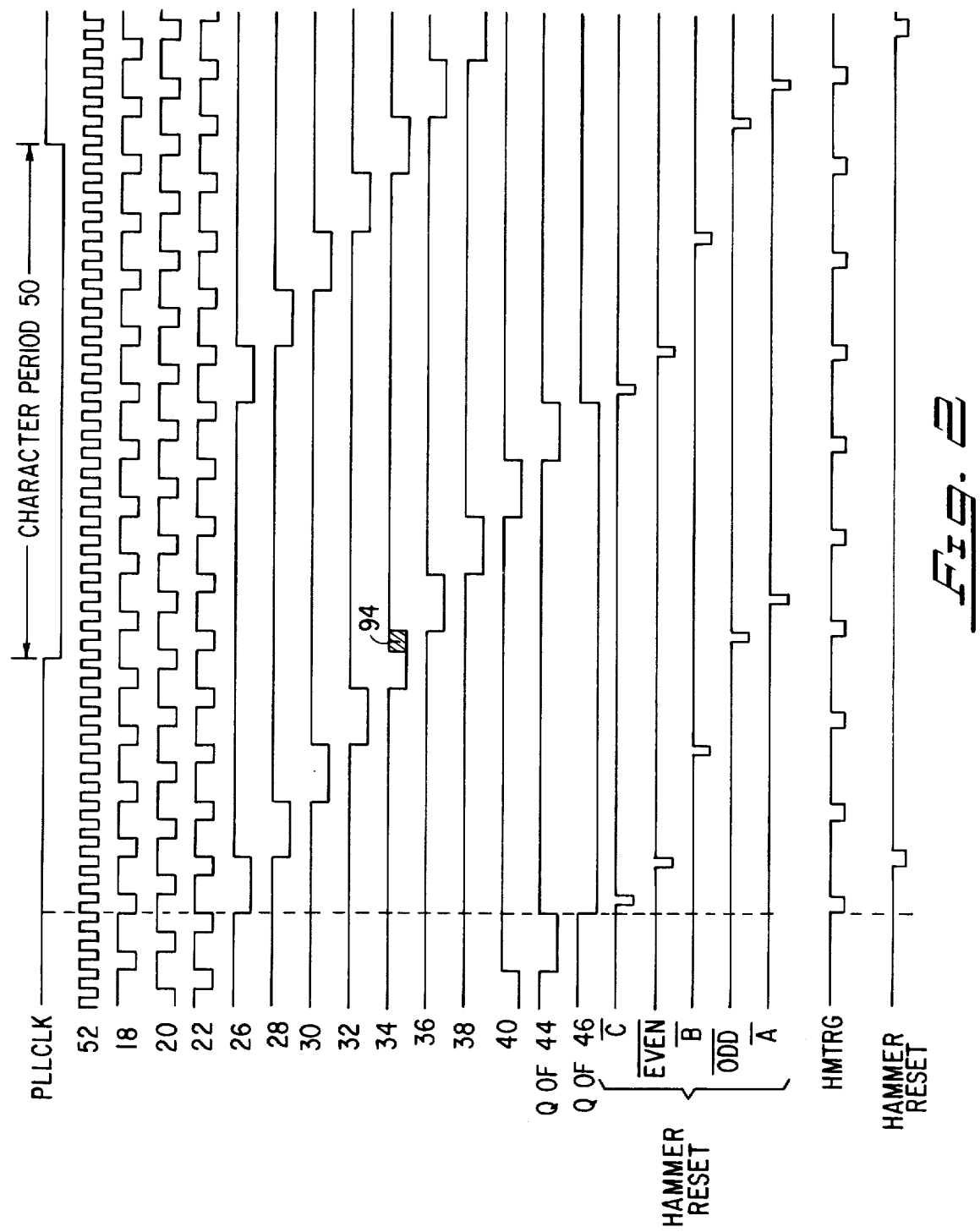
FIG. 2 is a timing diagram showing the relationship between the character pulse and the various pulses generated within the circuitry of FIG. 1.

Output 40 of shift register 24 is used as a D input and D-type flip flop 44. D type flip flop 44 serves as an extention of shift register 24 to effectively make the output of flip flop 44 as the divide-by-nine circuit output. The clock input to flip flop 44 is coupled to output 22 of shift register 14 while the clock input of flip flop 46 is the Q output of flip flop 44. The Q̄ output of flip flop 46 is fed back in as the D input of flip flop 46 while the Q output of flip flop 46 is fed back as a feedback input 48 to phase lock loop oscillator 10. Flip flop 46 serves as a conventional divide-by-two circuit. In this manner, phase lock loop oscillator 10 functions as a frequency multiplier creating at its output 12 a synchronized signal, a shift register pulse train or clock, dividing character period 50 as shown in FIG. 2 into 54 discrete intervals, T, or 27 clock pulses 52. The waveform of each of the outputs form shift register 14, and 24 flip flops 44 and 46 is graphically illustrated in the timing diagrams of FIG. 2.

Selected outputs from shift register 14 and 24 are provided as inputs to the inverted input ports of and gates 54-60. Consider, for example, the output of and gate 54 in view of the timing diagram of FIG. 2. Assume that input 68 is false. The output of and gate 54 will be true only when both inputs 64 and 66 are false. Assuming, for the sake of clarity and illustration only, that true is a high logic level, consider output 32 of shift register 24 and output 22 of shift register as shown in FIG. 2. The coincidence of the false states of output 22 and 34 is shown in the hatched period 94 of the wave form of output 34. The output of and gate 54 is inverted by inverter 96 and coupled to the inverted input of gate 106. When inputs 108 and 110 are both false, the output of and gate 106 is true. Input 110 is coupled to the output 12 of oscillator 10. Hatched period 94 is exactly one period of shift register clock 52 and thus the coincidence is half a period of clock 52 which is inverted by inverter 112 and shown as the hammer reset signal, odd in FIG. 2.

Similarly, when gate 56 is selected by input 74, the coincidence of the false states of output 26 of shift register 24 and output 22 of shift register 14 will ultimately generate the hammer reset signal, even, shown in FIG. 2. Each of the gates 58, 60 and 62, when selected by the respective inputs 80, 86 and 92, will generate the Ā, B̄ and C̄ signals.

Hammer trigger, HMTRG, is generated nine times within any given character period. The shift register input clock from output 12 of oscillator 10 is inverted by inverter 114 and used as the clock input for a five bit shift register 116. Outputs 118 and 120 are provided as the inputs to nand gate 122 whose output is fed back to shift register 116 in a conventional manner. The hammer reset signal from inverter 112 is used as the clear input 124 of shift register 116. The output of nand gate 122 is fed back to the serial input 130 of shift register 116, clocked by the inverted shift register input clock. Assuming that shift register 116 is clocked on the positive transition of its clock input, output 118 and 120 will appear as shown in FIG. 3. They will be combined in nand gate 122 to form the wave shape illustrated in FIG. 3. The nand function of output 118, inverted output 120 and shift register pulses or clock 52 will generate the hammer trigger pulses, HMTRG, as shown in FIG. 3. Each pulse will be active low and of a duration equal to one-half cycle width, a unit time, T, of the shift register clock 52. Inasmuch as each cycle of hammer trigger, HMTRG, is a duration of six T, nine such pulses will be generated during the character period. Since the hammer reset is the clear signal for shift register 116, during the initialized period, it can be demonstrated that outputs 118 and 120 require a interval of two T following their initiation before the first active low hammer trigger signal will be generated. Thus, the relationship between hammer trigger and hammer reset as shown in FIG. 2, is verified by the circuitry of FIG. 1.

The operation of the present invention in the presently illustrated embodiment may now be understood.

Each hammer, for example, has a width of 0.200 inches. However, the distance between the center of each font character on the print band is 0.225 inches. Since the band printer moves 0.225 inches in a single character width, during a time interval, T, any given font character will move 1/54th of 0.225 inches or approximately 0.00417 inches. During a full cycle of shift register clock 52, any given font type will move approximately 0.00833 inches.

Turning now to the timing diagram of FIG. 2, assume that the printer is printing even and odd cycles. It can be verified from the timing diagram that the "even" and "odd" hammer reset pulses occur with a regular periodicity of 12 cycles (24T). Similarly, it can be verified from the timing diagram that the "A" print position occurs two cycles (4T) after the "odd" print position while the "B" print position occurs eight cycles before the "A" print position and six cycles before the "odd" print position. A similar relationship exists between the "even" print position and "B" and "C" print positions. Beginning at the center of the hammer, the distance traveled by the font type during six cycles (12T) will be approximately halfway from the center of the print hammer to its edge, or in the "odd" or "even" print positions. Similarly, moving from the center of the hammer by a distance traveled by any given font type during eight cycles (16T) will be a distance equal to one-third the width of the print hammer, or in other words, the "A" or "C" print position, while the "B" print position remains dead center on the hammer face. Thus, it can be seen that the timing diagram of the hammer reset signal are delayed one from the other with precisely the correct timing to generate trigger signals to fire the hammer in a symmetric double or triple spanning mode.

However, it can be appreciated that any given font type will completely transverse the face of the hammer in a period of time equal to 24 cycles of the shift register input clock 52. Yet, any given hammer reset signal will not reoccur until 27 clock cycles later. This discrepancy is due to the fact that the hammer width is less than the spacing between font characters. The three cycle discrepancy may be compensated by appropriately selecting the correct hammer trigger pulse from the nine pulse train shown in FIG. 3. It is to be noted that each pulse within the hammer trigger pulse train is separated from the subsequent or proceeding pulse by three cycles of shift register input clock 52. FIG. 1 shows an addressable latch 132 having its output coupled to inputs 68, 74, 80, 86 and 92 of gates 54–62. By selectively activating one of the outputs of latch 132, the printer system can be directed to generate only "odd," "even," "A," "B" or "C" hammer reset pulses. Latch 132 is coupled to a central processing unit which selects the proper type font position by program control. Such a central processing unit is described in greater detail in the co-pending application entitled "Microprogrammable Processor-Printer Controller" filed on June 16, 1977, Ser. No. 805,527, and assigned to the same assignee of the present invention. The hammer trigger signal, HMTRG, is supplied as a data input to the central processing unit to synchronize a program controlled clock which generates the actual hammer firing signal input to a conventional matrix driver circuit. The central processing unit internally counts the character pulses, identifies the beginning of the print band and has an image of the print band stored within a programmable read only memory. The central processing unit reads an identifier code from the print band to signify to the processor whether the band is a normal band or a compressed band, and selects the appropriate image PROM to make the required comparison and decision. Under program control, the central processing unit will appropriately select one of the signals in the hammer trigger pulse train, namely that one having the proper delay, to fire any given hammer at the proper time to permit impact between the hammer and type font in the selected print position. In this manner, the central processing unit can appropriately control the phasing and timing of the hammer bank to employ the hammers either as double or triple spanning hammers by use of the circuitry illustrated in FIG. 1.

Although the present invention has been described in connection with a particular embodiment, it is to be understood that the character period may be divided into other numbers of discrete intervals depending upon the distance on the print band between the font characters, the width of the hammers, and the number and nature of print modes desired without departing from the spirit and scope of the present invention. Thus, many alterations and modifications may be made in the illustrated embodiment without departing from the concept and scope of the presently claimed invention. It can also readily be appreciated that complex phasing and timing required in a multi-mode, multiple spanning hammer can be achieved by use of the circuitry of the present invention with dramatic simplicity in a manner such that the phase and timing control is substantially independent of band speed variations. As a result, no adjustments ar required to synchronize the hammer timing phasing control over a wide range of operating conditions, or to convert the hammers from double to triple spanning operation.

I claim:

1. A circuit for timing control in an impact printer employing multiple-character spanning hammers in combination with a moving character font and means for generating of a plurality character pulses signifying movement of each character within said font by a distance equal to the distance separating each character, said circuit comprising:

an oscillator means having an input coupled to said character pulses, said oscillator means for generating a preselected number of clock pulses during each said character pulse;

shift means for generating a pulurality of shifted pulses corresponding to said number of clock pulses, said shift means having an input coupled to said oscillator means; and logic means for logically combining selected ones of said plurality of shifted pulses, for selectively generating a plurality of hammer trigger pulses, and for selectively generating a hammer reset pulse, whereby timing for said multiple-character spanning hammers may be effected to track variations in character font velocity and to provide appropriate timing for multiple modes of printing with said multiple-character spanning hammers.

2. The circuit of claim 1 wherein said oscillator means is a phase locked loop oscillator employed as a frequency multiplier.

3. The circuit of claim 1 wherein said shift means includes at least one shift register to divide said clock pulses down to a signal having the same frequency as said character pulses.

4. The circuit of claim 1 wherein said shift means includes a first shift register circuit means for dividing said clock pulses to a signal having the same frequency as said character pulses and for generating a first group of shifted pulses for as inputs to said logic means generating said hammer reset signal signal, and a second shift register means for generating a second group of shifted pulses as inputs to said logic means for generating said hammer trigger pulses.

5. The circuit of claim 1 said oscillator means generates 27 clock pulses during each said character pulse.

6. The circuit of claim 5 wherein said shift means generates nine first shifted pulses during each said character pulse and three second shifted pulses during each of said nine first shifted pulses.

7. The circuit of claim 6 for use with a computer means for selectively generating an insruction signal wherein said logic means generates five hammer reset pulses, selects one of said five hammer reset pulses to correspond to a selected one of five print positions in response to said instruction signal, and generates a uniform pulse train of nine hammer trigger pulses during each of said character pulses.

8. A circuit for timing control in an impact printer employing wide spanning hammers in combination with a moving font band and means for generating a plurality of character pulses signifying movement of each character of said font band by a distance equal to the distance separating each character, said distance being greater than the width of said wide spanning hammers, said circuit comprising:

a phase locked loop oscillator having said character pulses as a controlling input, said phase locked loop oscillator generating a predetermined number of shift register pulses during each character pulse, a first subset of said number of shift register pulses equaling an integrally divisible number of said shift register pulses to permit firing of said wide spanning hammers at a preselected plurality of print positions, and a second subset of said predetermined number of shift register pulses providing the remaining ones of said predetermined number of shift register pulses;

a first shift register circuit having said shift register pulses as a controlling input, said shift register circuit for generating a uniform plurality of first shifted pulses, each first shifted pulse having an active nonoverlapping state within said character pulse, one of said first shifted pulses being in said active state at each instant during said character pulse, and said first shift register circuit for generating a uniform plurality of second shifted pulses, each second shifted pulse having an active nonoverlapping state within each of said first shifted pulses, one of said second shifted pulses being in said active state at each instant during said first shifted pulse; and a plurality of logical gates for logically combining selected ones of said first and second shifted pulses, said shift register pulses and external command signals to selectively generate one of a plurality of timed hammer reset pulses, whereby timing for said wide spanning hammers may be effected to track variation in band font speed and to provide appropriate timing for multiple mode of printing with said wide spanning hammers.

9. The circuit of claim 8 further including a second shift register circuit responsive to said shift register pulses generated by said phase locked loop oscillator to generate a plurality of third shifted pulses logically combined in a logic circuit to generate a pulse train of hammer trigger pulses having an active state temporally separated by a duration equal to said second subset of said predetermined number of shift register pulses.

10. The circuit of claim 9 wherein 27 shift register pulses are generated during each character pulse, 24 of said pulses being in said first subset and three being in said second subset.

11. The circuit of claim 10 wherein said second shifted pulses are generated by a divide-by-three shift register having said shift register pulses as a clock input, wherein said first shifted pulses are generated by a divide-by-nine shift register having one of said second shifted pulses as a clock input, and wherein a divide-by-two shift register has one of said first shifted pulses as a clock input and an output coupled to said phase locked loop oscillator.

12. The circuit of claim 11 wherein said second shift register generates two shifted pulses and has the inverted shift register pulses as a clock input, and wherein said two shifted pulses and shift register pulses are logically combined in a nand gate to generate nine hammer trigger pulses during each character pulse, each hammer trigger pulse being temporally separated by a duration of three shift register pulses.

* * * * *